United States Patent [19]

Monnier

[11] Patent Number: 4,741,090

[45] Date of Patent: May 3, 1988

[54] CENTERING DEVICE FOR INSERTING PINS IN A MULTIPIN HOUSING

[75] Inventor: Michel J. C. Monnier, Montgeron, France

[73] Assignee: U.S. Philips Corporation, New York, N.Y.

[21] Appl. No.: 937,640

[22] Filed: Dec. 3, 1986

[30] Foreign Application Priority Data

Dec. 13, 1985 [FR] France ............................... 85 18471

[51] Int. Cl.[4] ................................................ B23Q 3/06

[52] U.S. Cl. ..................................... 29/464; 29/281.1; 29/281.5; 228/44.7; 269/50; 269/54.5

[58] Field of Search ...................... 29/837, 840, 281.1, 29/281.5, 464; 228/44.7, 179; 269/47, 50, 52, 54.5; 361/403, 421; 357/74

[56] References Cited

U.S. PATENT DOCUMENTS

| | | | |
|---|---|---|---|
| 3,276,854 | 10/1966 | Felker et al. | 29/464 X |
| 3,299,502 | 1/1967 | Wanesky | 29/464 X |
| 3,390,450 | 7/1968 | Checki, Jr. et al. | 29/464 X |
| 3,689,985 | 9/1972 | Nier et al. | 29/464 X |
| 3,745,422 | 7/1973 | Carnes | 29/589 X |
| 3,978,579 | 9/1976 | Checki, Jr. et al. | 29/589 |
| 3,992,770 | 11/1976 | Myers | 29/464 X |
| 4,296,456 | 10/1981 | Reid | 357/74 X |

*Primary Examiner*—Howard N. Goldberg

*Assistant Examiner*—Carl J. Arbes

[57] ABSTRACT

Centering device for inserting pins in a multipin housing designed to receive an integrated circuit, whose pins are in the form of stems fitted with flat heads. The stem goes through a plane part, called the housing substrate, through holes which have first been metallized, with the pins protruding from one of the faces of the substrate by a length sufficient to ensure the fastening of the housing. The flat head bears upon the other face of the substrate via a metal preform of an alloy which is suitable for ensuring the fusion or melting for fastening the pins. This centering device consists of three parts. The first part is formed by a first metallic plate; the second part is formed by a second metallic plate used for calibrating the centering of the pins, said metallic plate being drilled with holes arranged in a geometrical pattern in compliance with the pattern chosen for the arrangement of the pins on the housing and calibrated so as to hold and to center the stems in the housing holes. The third part consists of a gripping device to lock the substrate of the housing fitted with its pins on the first metal plate. The materials chosen for the first metal plate have an expansion coefficient close to the expansion coefficient of the substrate of the housing in the temperature range at which the pins are to be fastened and this first metal plate is locked to the substrate of the housing during the fastening of the pins. Only the first metal plate is brought to this fastening temperature.

7 Claims, 4 Drawing Sheets

CENTERING DEVICE FOR INSERTING PINS IN A MULTIPIN HOUSING

Figure 1A:
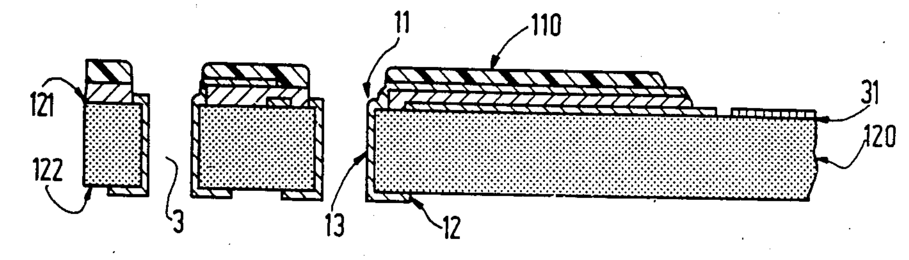

The invention concerns a centering device for inserting pins in a multipin box designed to receive an integrated circuit board. The pins are in the form of stems fitted with flat heads. The stems go through a flat part called the housing substrate through holes which have first been metallized. The stems protrude beyond one of the faces of the substrate by a sufficient length to ensure the fastening of the housing, with the flat head bearing against a metal form of an alloy designed to fasten the pins by melting or fusion to the other substrate face.

The invention also concerns the method for manufacturing such a housing by means of this device.

A multipin housing of this type is described in EP No. 188,838, published July 30, 1986. But the centering devices for the pins used until now, and incidently not described in the document mentioned, have a number of disadvantages.

These known centering devices, are graphite molds, drilled with holes to match the stems of the pins, and laid out according to the geometrical arrangement provided for these pins. These centering devices are each allocated to a box during the operation of fastening the pins and are therefore subjected, at the same time as the housings to the high temperatures necessary for this fastening. Consequently, the repetition of these operations quickly wears out this type of centering device. These known centering devices can be used only a limited number of times.

Naturally, this characteristic makes the work of preparing for a production run of housings quite long, because it is necessary to first prepare a run of a great number of molds, which must be accurately made, and which need to be replaced frequently. So this preparation is expensive in raw material and in working hours. The use of such centering devices for pins partially explains today's extremely high cost of multipin housings.

Now these multipin type housings, those with at least 300 or 400 pins, are expected to become more and more commonly used in the near future.

This is why this invention proposes a device such as the one described in the preamble, to make it possible to solve these problems.

According to this invention, the device is composed of three parts, the first part consisting of a first metal plate, the second part consisting of a second metal plate used to calibrate the centering of the pins, drilled with holes arranged in a geometrical pattern in compliance with the pattern chosen for the arrangement of the pins on the housing and calibrated in order to both hold and center the stems in the holes of the housing, and the third part consists of a gripping device to lock the substrate of the housing fitted with its pins on the first metal plate, the materials chosen to make the first plate have an expansion coefficient close to that of the housing substrate within whose temperature range the pins are fastened, the first metal plate upon which the housing substrate is locked during the fastening of the pins is the only one brought to this fastening temperature.

Such a device has the following advantages among others: It is unique for a whole turn of housings produced, that is, it is reusable a great number of times, because the part which is built with accuracy and which is used for calibrating the centering of the pins, is not brought to high temperatures at the same time as the housing, during the pin fastening operation. Only a single metal plate, with little accuracy, accompanies the housing during this operation.

So this device makes housing production much less expensive. Furthermore, the pins of the housings, built with the aid of this device, provide a particularly good mechanical resistance to tearing free.

Figure 1B:
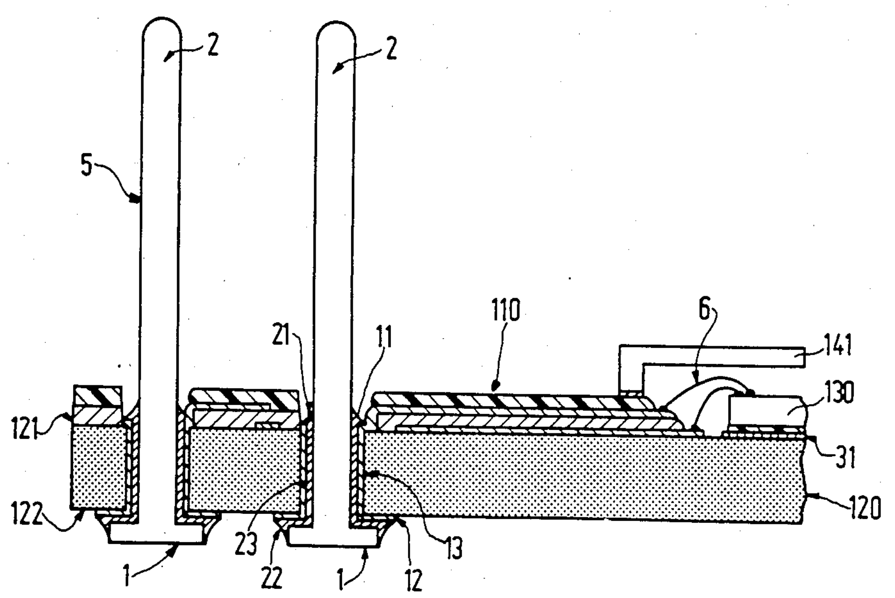
Figure 2A:
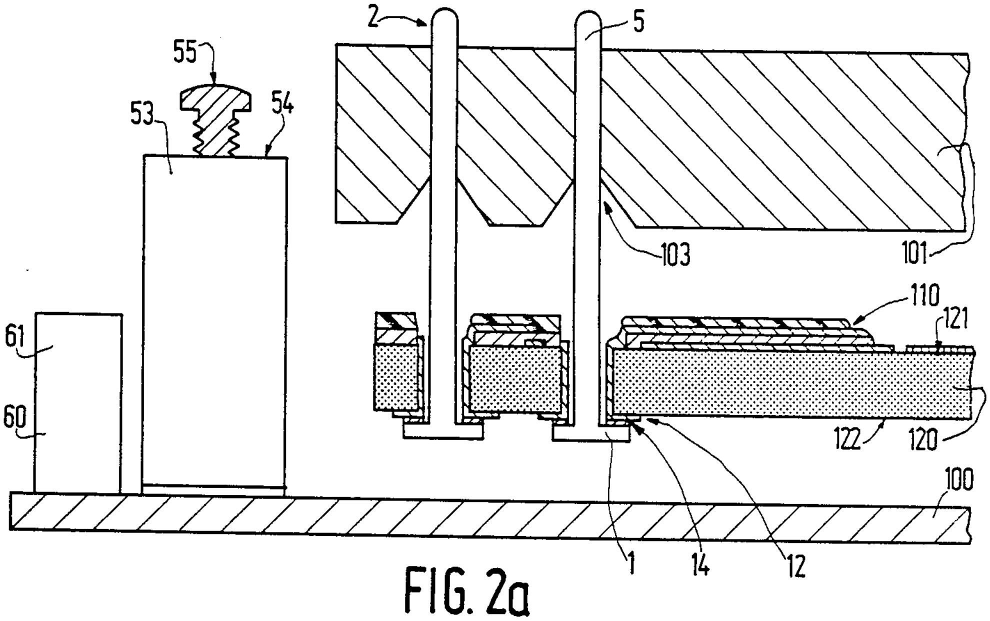
Figure 2B:
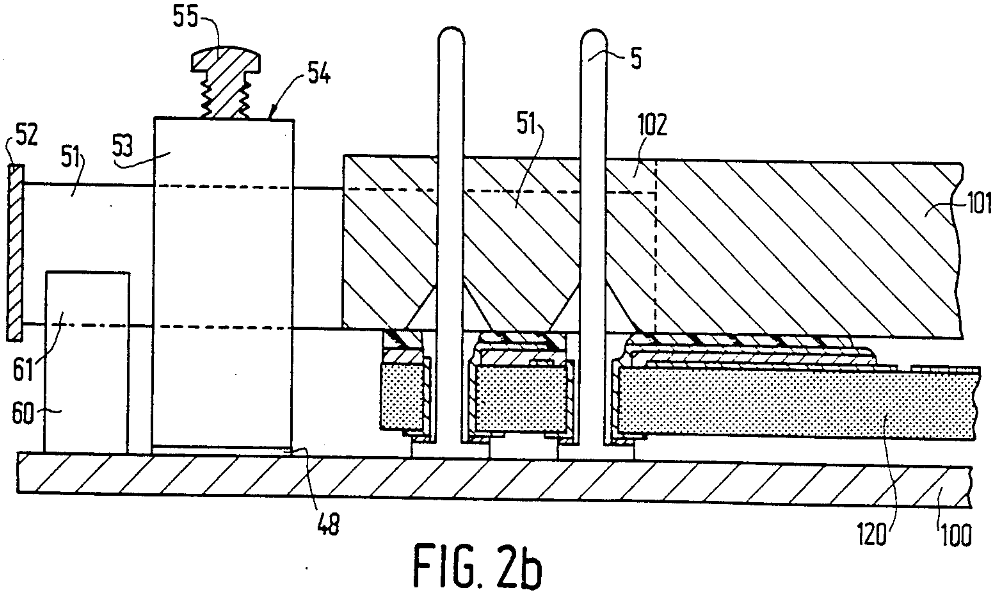
Figure 2C:
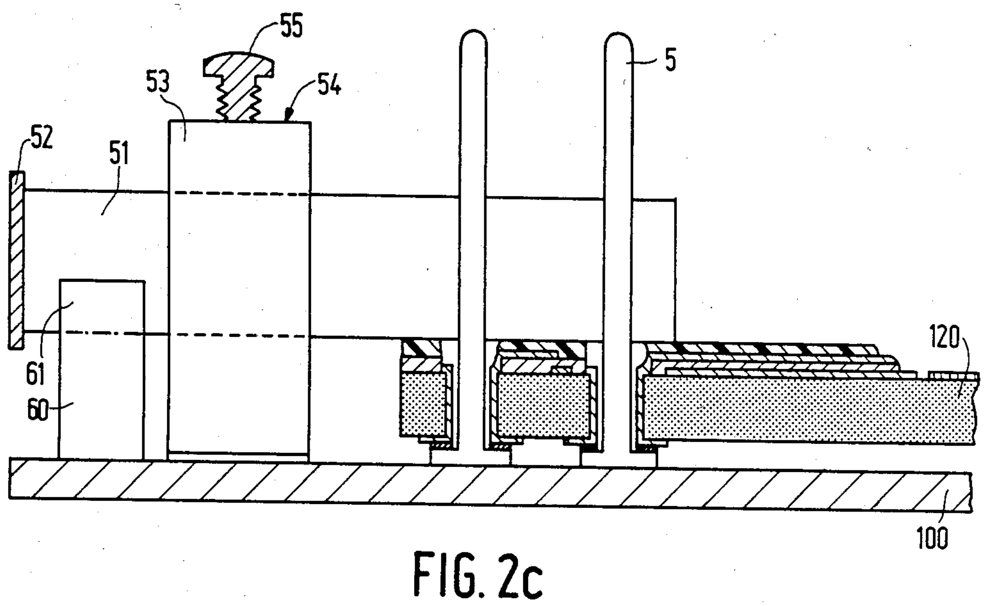
Figure 3A:
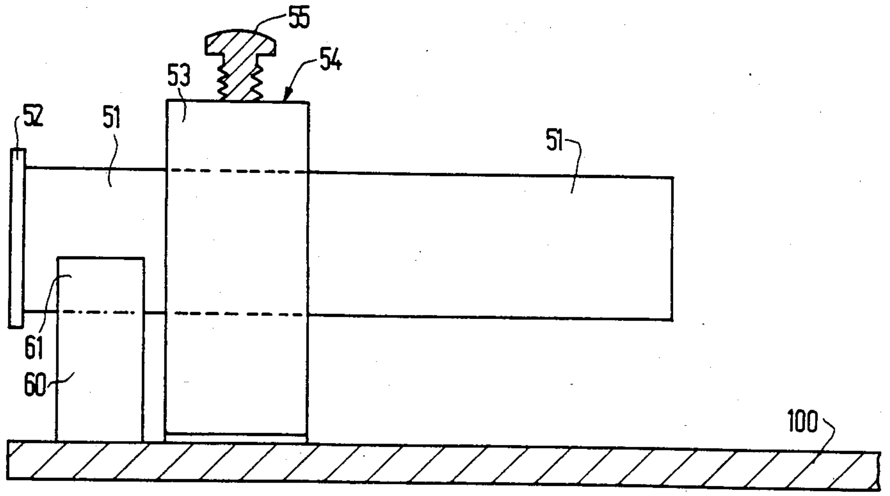
Figure 3B:
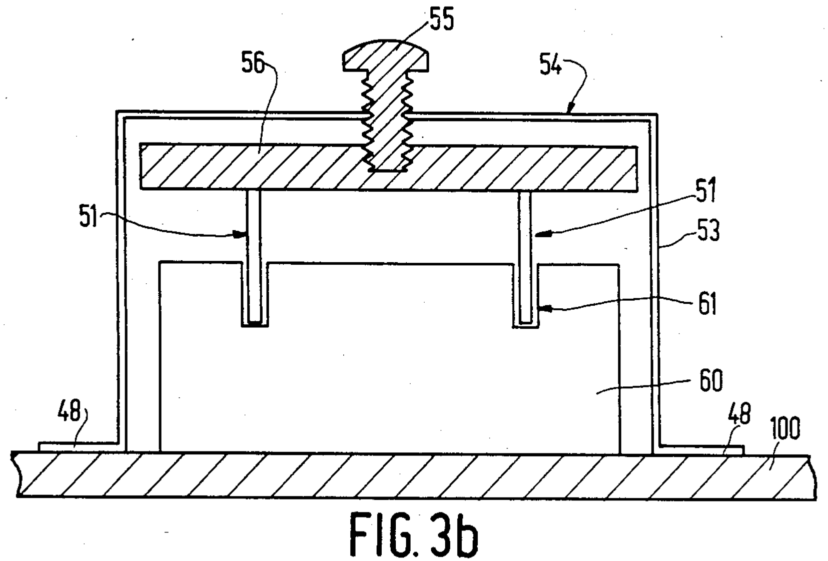
Figure 3C:
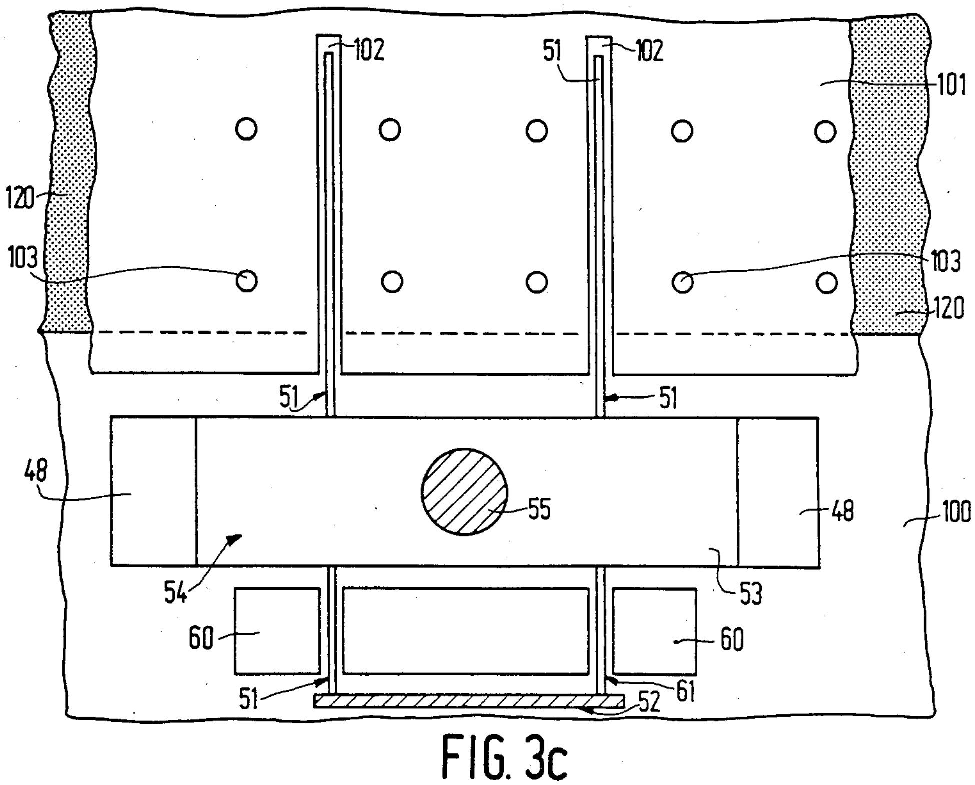

The invention will be better understood with the aid of the following description, illustrated by the appended figures, including:

FIG. 1*a* which, in simplified section, shows a part of the multipin housing before the pins are positioned, FIG. 1*b* which, in a simplified sectional view, shows part of a multipin housing, fitted with its pins, FIG. 2*a* which, in the mounting position of the housing, shows the centering device according to the invention, FIG. 2*b* which, in pin centering position, shows the centering device according to the invention, FIG. 2*c* which, in pin fastening position, shows the centering device according to the invention, FIGS. 3*a*, 3*b* and 3*c* which, in detail, show the housing gripping device on the first plate of the device according to the invention, with FIG. 3*a* being a view from the side, FIG. 3*b* a view in a section perpendicular to the view of FIG. 3*a*, and FIG. 3*c* being a view from above which shows the relative positions of a locking device and of the two plates forming the centering device.

As represented on FIG. 1*a*, in simplified section, the multipin housing consists of a plane substrate 120, whose two faces are referenced 121 and 122. This substrate is drilled with holes 3, designed to receive the pins. Each hole is first metallized at the positioning of the pins, by metallization 13, plus an annular metallization 11 on face 121, and 12 on face 122. By means of annular metallization 11, the metallizations of the holes and therefore afterward of the pins are connected to a circuit 110, which may be a multilayer. Zone 31 is designed to receive the integrated circuit die.

In simplified section, FIG. 1*b* represents a part of the housing, fitted with its pins, as obtained by the method using the centering device according to the invention.

This finished housing includes an integrated circuit die 130 whose output contacts are connected to circuit 110, for example, by flexible wires 6, and which is protected, for example, by cover 141.

This housing also includes pins 5 consisting of a stem 2 and a flat head 1. These pins are made non-detachable because flat head 1 of the pins bears upon face 122 of support 120, and because the pins are fastened by a metallic compound filling the space 23 between the pins and the walls of the metallized holes, until the solidified parts 21 and 22 are formed.

So it is indispensable to hold the housing pins by a centering device during their fastening in the holes in order to obtain a proper distribution of the metal fastening compound in space 23.

For a housing whose support 120 is ceramic, the centering device known now by technicians is generally made up of a graphite plate, drilled with calibrated holes. Graphite has the property of being easily machineable at a moderate price. But this material has an expansion coefficient which is not very well adapted to the expansion coefficient of the ceramic within the temperature range at which the pins are fastened. It is however brought to the high temperature of the metal component used for fastening the pins at the same time as the housing. Under these conditions, it rapidly becomes unusable due to thermal and mechanical damage; it flakes away after a very small number of uses.

The invention proposes in contrary a centering device which can be used a great number of times and which can therefore be used for producing a great number of housings.

As shown in FIG. 2*a*, in the position far from the housing, this centering device comprises three parts. The first part is made up of a first metal plate means 100. The second part is made up of a second metal plate means 101 used for calibrating the centering of the pins, drilled with holes 103, arranged in a geometrical pattern, in compliance with the pattern chosen for the arrangement of the pins on the housing. These holes 103 are calibrated in order to both hold and center the stems 2 in the holes 3 of the housing. The third part is designed to lock the housing 120 on the first metal plate 100 once the pin centering has been performed by means of the calibration plate 101.

This locking device, or gripping means is shown in detail on FIGS. 3*a* and 3*b*. On the one hand it has strip means comprising at least two strips 51, with thickness less than the distance between two pins. These strips are integrated with a backing plate 52 which maintains their spacing. This spacing should correspond to an interval between a certain number of pins. The strips 51 are mounted on the backing plate 52, parallel to each other and perpendicular to the backing plate. They can slide in grooves 61 of a fixed terminal 60 (FIG. 3*a*). Integrated with the first metal plate 100, the locking device also includes a strap 53 fastened by tabs 48, made of a material which is both refractory at the pin fastening temperatures and capable of possessing elastic properties at these temperatures, so that the upper part 54 of this strap constitutes a spring at these temperatures. This material may, for example, be bronze-beryllium. In the upper part 54 of the strap, a screw 55 turns which moves pressure plate means a plate 56 (FIG. 3*b*) parallel with the upper part 54 of the strap. The strap and the plate 56 form a system known as a "Mohr clip". The material used to make the strips 51, the backing plate 52 and the plate 56 is chosen among any materials whose only property is to be refractory at the pin fastening temperature. The position of plate 56 and the dimensions of strap 53 are such that strip 51 can be easily slipped under plate 56 perpendicular to the plane of the first plate 100 on which the strap is fastened.

At least two of these locking devices will be necessary to lock the support 120 on the first plate 100 during the pin fastening operation. For this purpose, these two locking devices are to be arranged on two parallel sides, opposite substrate 120.

If substrate 120 of the multipin housing is of ceramic, the metallic material of the first plate 100 of the centering device must have an expansion coefficient compatible with ceramic in the temperature range to which the substrate is brought to ensure the fusion of the metallic component for fastening in space 23 between the pins and the walls of the metallized holes of substrate 120. This is because only plate 100 will be brought to the pin fastening temperatures at the same time as box housing 120.

In case of a substrate 120 of ceramic, it may be advantageous to decide to metallize the holes with the aid of a conducting compound of silkscreen oriented copper in a non-oxidizing atmosphere such as, for example, the known compound of French patent application published under number FR No. 2305478 or even FR No. 2437427.

These components withstand a baking temperature, in nitrogen atmosphere, from 850° C. to 950° C. and have a very good electrical conductivity of about 1.5 milliohms per square for layers with thickness of 20 microns.

The silkscreenable ink designed for the metallizing of holes 3 is brought in the holes, for example by suction, in order to smear the walls of the hole; then it is baked. Crowns 11 and 12 are made during the same operation, around holes 3, on each of the faces 121 and 122 of substrate 120, respectively.

Furthermore, for this application, an advantageous metal for forming the pins is, for example, iron-nickel-cobalt.

Finally, the analysis of the expansion coefficients of the ceramic in the temperature range from 750° C. to 850° C. shows that materials such as molybdenum or one of the alloys of iron-nickel-cobalt known under the registered trademark names Dilver P and VACON 70 have expansion coefficients which are perfectly adapted to that of ceramic in this temperature range. So these materials are very appropriate to constituting the first plate 100 of the centering device according to the invention.

To perform the fastening of the pins and then to fill space 23, a choice could then be made, for example, of a silver (≃71%), copper (≃28%), nickel (≃1% in weight) alloy which has a temperature interval between solid and liquid from 780° C. to 795° C., enabling a fusion cycle which is not very critical. For this purpose, an annular preform 14 of this ternary compound (or any compound chosen for the fastening of the pins) can be made, and positioned on face 122 of substrate 120 between flat head 1 of the pin to be fastened and the annular metallizing 12.

With the pins 5 and the annular preforms 14 positioned, plate 101 is threaded onto stems 2 while plate 100 holds flat heads 1 applied against preforms 14 and surface 122 of substrate 120.

The centering device is then locked in this position by gripping devices as shown on FIGS. 3*a*, 3*b* and 3*c*.

For each of the locking devices (at least 2), the strips 51 are first of all slid, perpendicular to the plane of the first plate 100, into the guide grooves 61, of terminal 60, fastened to plate 100 (FIG. 3*a*).

Next, the strips 51 are slid perpendicular to the plane of the first plate 100, under the plate 56 of the Mohr clip, with screw 55 being loosened to enable their passage (FIG. 3*b*).

Strips 51 are then slid between two pins in grooves 102 in the second plate 101. These grooves, on the one hand, have a large enough opening to let the strips 51 penetrate, and on the other hand, are distant from each other by the same distance as the fastening distance of the strips on the back 52 (FIG. 3*c*).

Screw 55 is then tightened. Plate 100 therefore locks the pins, bearing against their flat head 1, exactly in the position where they have been centered by the second plate 101, called the calibrating plate (FIG. 2*b*).

The said plate 101 can then be taken out. And only the unit formed by plate 100, substrate 120 fitted with pins and preforms 14, locked together by the refractory gripping device, is brought to the fusion temperature of the alloy of the preforms 14 (FIG. 2*c*).

To obtain a good distribution of the pin fastening alloy in the spaces 23, the unit made up of the centering-substrate device of the housing must be such that plate 100, preforms 14 and flat heads 1 are in a position which is lower in relation to spaces 23, substrate 120 and stems 2.

This is because, when the pin fastening alloy is brought to its fusion or melting temperature, preforms 14 melt and the fastening alloy "rises" in the spaces 23 by capillary action.

So the procedure using the centering device according to the invention includes the following steps:

(a) inserting pins 5 in the metallized holes 3 of the substrate 120 with flat head 1 of the pins bearing against surface 122 of this substrate fitted with the annular metallizations 12 and the annular preforms 14 of the fastening compounds;

(b) holding the flat heads with the aid of plate 100 of the device;

(c) inserting of stems 2 in holes 103 of plate 101 of the device in order to center them;

(d) fastening of housing 120, centered on plate 100 by means of the gripping device;

(e) removal of plate 101 which is placed aside;

(f) transition of the locked housing plate 100 unit to the proper temperature to melt preforms 14;

(g) cooling, disassembly and recovery of plate 100 for later use.

In the centering device according to the invention, it is clear that only plate 101 is fragile because it is made with the precision necessary for centering the pins. Well, this plate can be used a long time because it is exclusively used for the positioning and centering of the pins, and is never brought to the melting temperature of the fastening alloy. So it has no occasion to be damaged. On the other hand, plate 100 which is subjected to temperature rises is less fragile. So it will no longer be easily damaged and will also be usable for a long time.

The housings made in compliance with the invention are therefore less expensive because the centering device is recoverable and because the pin inset procedure is simplified. Also, these boxes are very solid because the pins cannot be torn out.

What is claimed is:

1. In a centering device for inserting pins in a multipin housing, said housing having a substrate with two faces and being designed to receive an integrated circuit die, said substrate having metallized apertures, said pins being in the form of stems fitted with flat heads, said stems passing through said metallized apertures, said stems protruding beyond one of the faces of the substrate by a predetermined length, said flat heads bearing upon the other face of the substrate, each said flat head having a metal preform made of an alloy suitable for fastening the pins by fusion, said preforms being located between said flat heads and said other face of said substrate, said centering device including three parts, said first part being a first metal plate means, said second part being a second metal plate means for calibrating the centering of said pins, said second metal plate means having apertures arranged according to a geometrical pattern in compliance with the pattern chosen for the arrangement of the pins on the housing and being calibrated for both holding and centering the stems temporarily in the apertures of the housing, said third part being a gripping means for locking the substrate of the housing fitted with its pins on said first metal plate means so that said second metal plate means may be removed from said pins after centering the stems, said first plate means having a coefficient of expansion substantially the same as the coefficient of expansion of the housing substrate in the temperature range in which said preforms can fuse said pins to said substrate.

2. In a centering device as in claim 1, wherein said first metal plate means has affixed to it a terminal block with at least one pair of first grooves, each groove of each pair being spaced from its associated groove a distance corresponding to the distance between adjacent pins, said second plate means including at least one pair of second grooves, each groove of each pair of said second grooves being spaced from its associated groove a distance corresponding to the distance between each pair of said first grooves, said gripping means comprising a backing plate and at least two parallel strip means attached to said backing plate at a distance corresponding to the distance between said first grooves, said strip means being inserted in said at least one pair of first grooves and in said at least one pair of second grooves and aligning said first metal plate means with said second metal plate means in a prescribed manner.

3. In a centering device as claimed in claim 2, wherein said strip means rest on said substrate and said gripping means includes a strap affixed to said first metal plate, said strap forming a passageway between said at least one pair of first grooves and said at least one pair of second grooves, said gripping means also including pressure plate means in said passageway and screw means on said strap for causing said pressure plate means to apply pressure to said at least two parallel strips to lock said substrate on said first metal plate means.

4. In a centering device as claimed in claim 3, wherein said gripping means strap is made of bronze-beryllium.

5. In a centering device as claimed in claim 4, wherein said third part comprises at least two gripping means one such means placed on either side of the housing substrate.

6. In a centering device as claimed in claim 5, wherein said housing is a ceramic substrate, said first plate means is chosen from molybdenum or an alloy of iron-nickel-cobalt known by the trademark names Dilver P and VACON 70, and the fusion of the pins is done with a metal alloy whose melting temperature is about 800° C.

7. In a centering device as claimed in claim 6, wherein the pins are made of an iron-nickel-cobalt alloy and wherein the preforms are of a ternary alloy of silver-copper-nickel in respective proportions by weight of 71%, 28% and 1%, the fusion or melting temperature of which is approximately 800° C.

* * * * *